United States Patent

[11] 3,622,774

[72] Inventors: Norman J. Schuster, Woodland Hills, Calif.; Donald L. Ort, Brookside, N.J.; Gus D. Sams, San Gabriel, Calif.
[21] Appl. No. 873,928
[22] Filed Nov. 4, 1969
[45] Patented Nov. 23, 1971
[73] Assignee: Litton Systems, Inc. Beverly Hills, Calif.

[54] LIGHT SYSTEM FOR INSTRUMENTS
5 Claims, 5 Drawing Figs.

[52] U.S. Cl. ............................................. 240/8.16
[51] Int. Cl. ............................................. B60q 3/04
[50] Field of Search ............................. 240/8.16, 2.1, 9.5

[56] References Cited
UNITED STATES PATENTS

| | | | |
|---|---|---|---|
| 2,262,920 | 11/1941 | Carbonara | 240/9.5 X |
| 2,308,704 | 1/1943 | MacNeil | 240/2.1 |
| 2,695,354 | 11/1954 | Neugass | 240/8.16 |
| 2,804,540 | 8/1957 | Columbus et al. | 240/8.16 |
| 2,831,282 | 4/1958 | Hardesty | 240/8.16 X |

Primary Examiner—Louis R. Prince
Assistant Examiner—William A. Henry, II
Attorneys—Alan C. Rose, Ronald W. Reagin and Alfred B. Levine ABSTRACT: A lighting system for aircraft instrument panels including a light source generally surrounded by a reflector which directs light through a polarizing sheet and a collimating lens. The light is then transmitted through a refractor before impinging upon an instrument on the panel.

PATENTED NOV 23 1971 3,622,774
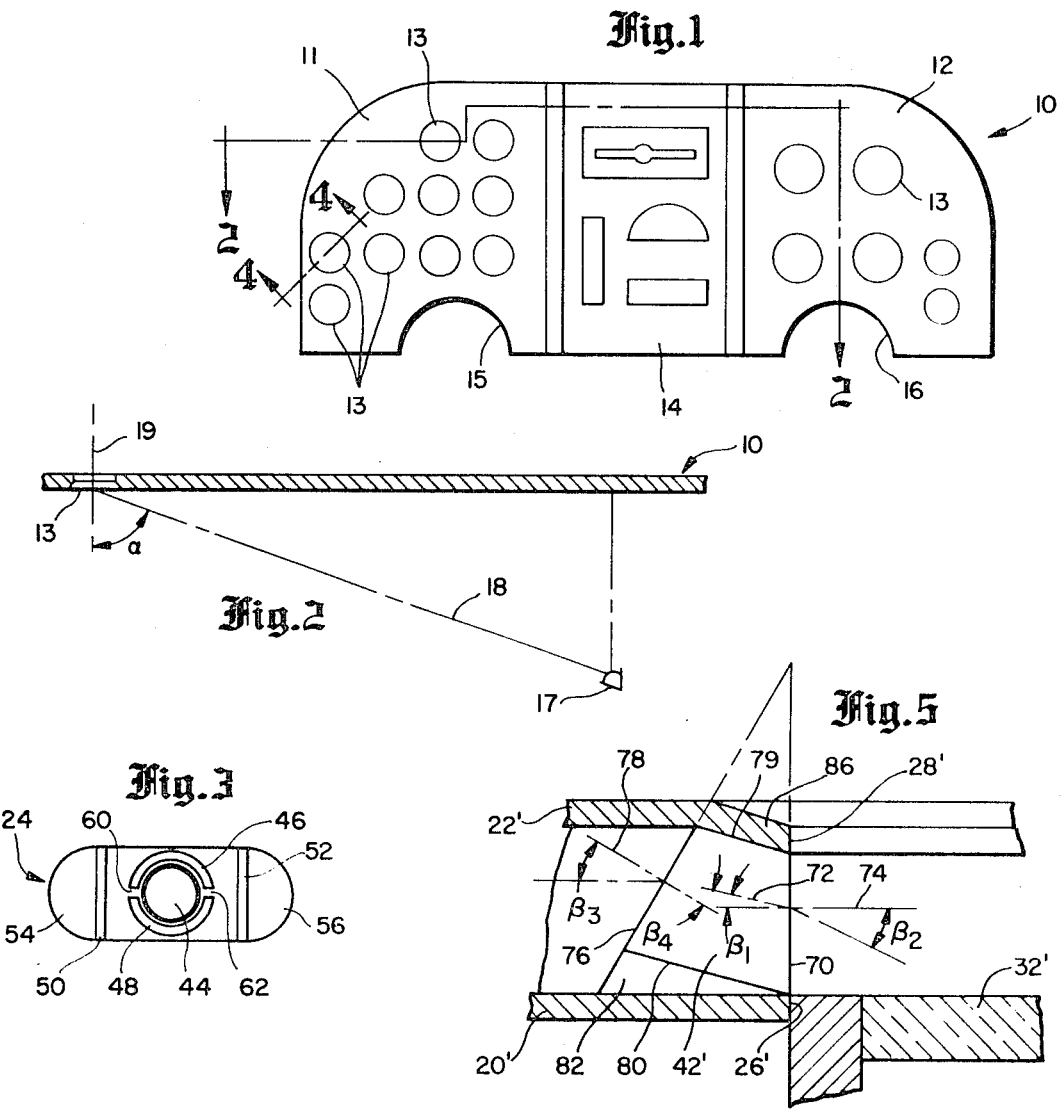
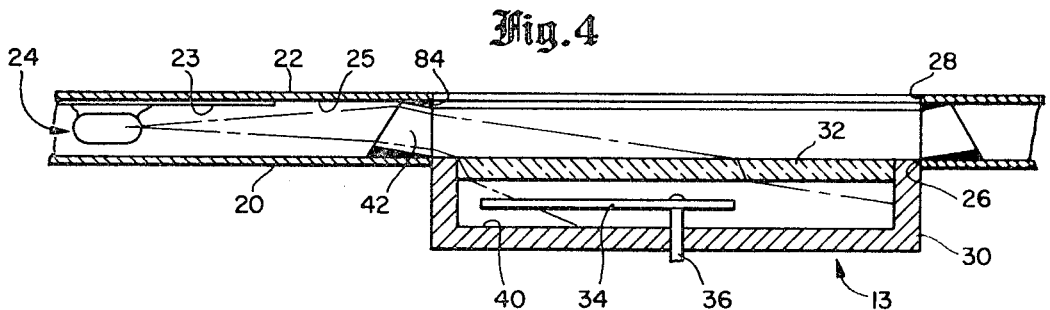
INVENTORS
NORMAN J. SCHUSTER
DONALD L. ORT
GUS D. SAMS 3,622,774

LIGHT SYSTEM FOR INSTRUMENTS

BACKGROUND OF THE INVENTION

1. Field of the Invention

The present invention relates to a lighting system and more particularly to an improved lighting system for instruments such as those used in aircraft instrument panels.

2. Description of the Prior Art

The prior art is replete with examples of improvements to the lighting system for instrument panels; for example, U.S. Pat. No. 2,858,417, "Instrument Dial Illuminator" to Stevens et al., U.S. Pat. No. 2,695,354 "Instrument Panel Lighting" to Neugass and U.S. Pat. No. 2,259,910, "Sealing and Illuminating Means for Indicating Instruments" to Rylsky. Much effort has been directed to evenly distribute light from a single point source to an instrument having a circular face. Efforts have also been expended attempting to reduce the amount of glare or reflected light from an instrument lens. Nevertheless, various reflections from the lens of an instrument have presented a continuing problem in environments where needless light reflections create safety hazards; such an environment is an aircraft cockpit. Satisfactory solutions to the problems of poor readability at certain angles caused by dark or dim spots on an instrument, of intense light reflection at relatively small angles from the normal to the face of an instrument, and of halo or ring effects about the peripheral portion of an instrument face have not yet been found. In addition, economic considerations remain important in most circumstances and especially for mass produced items.

SUMMARY OF THE INVENTION

In accordance with the present invention, the above-mentioned deficiencies and problems have been greatly minimized or eliminated by the provision of a lighting system including a light source positionable adjacent a support plate having an opening for viewing of the instrument in combination with a refractor for positioning about the opening, polarizing material for linearly polarizing light from the light source for positioning between the light source and the opening, a reflector positioned to surround a substantial portion of the light source, and a lens for collimating light from the light source and for positioning between the light source and the opening. The system results in a uniformly lighted instrument face with a minimum of reflection, regardless of the angle from which the instrument is viewed.

An object of the present invention is to provide a lighting system which substantially reduces or eliminates various reflections associated with an instrument and which is simply constructed and economical.

BRIEF DESCRIPTION OF THE DRAWING

FIG. 1 is a front view of an instrument panel exemplifying that which may be found in small aircraft.

FIG. 2 is a section view taken along Line 2—2 of FIG. 1 and additionally diagrammatically illustrates the position of a viewer of the panel.

FIG. 3 is a section view of a preferred embodiment of a lighting unit.

FIG. 4 is a side section view taken along Line 4—4 of FIG. 1 illustrating a preferred embodiment of a lighting system for the instrument panel.

FIG. 5 is a partial, modified and enlarged view of FIG. 4.

DESCRIPTION OF THE PREFERRED EMBODIMENTS

Turning now to the Drawing wherein like numerals designate like or corresponding parts throughout the several views, there is shown in FIG. 1 a view of an instrument panel 10 such as those commonly found in small private aircraft. While the construction of the instrument panel 10 and the light refracting portion thereof is the subject of a copending application, Ser. No. 873,927, filed Nov. 4, 1969, by Norman J. Schuster, they will be described in detail herein to insure clarity. The instrument panel may be divided into three sections, a left section 11 and a right section 12, each containing a multiple of instruments 13; while a middle section 14 contains communication apparatus. As viewed in FIG. 1, a pilot would normally be seated in front of the left section 11. A flight control wheel (not shown) extends through a semicircular opening 15 for use by the pilot for controlling the aircraft. A copilot is normally seated in front of the right section 12 and is able to control the aircraft with a second flight control wheel (not shown) extending through a second semicircular opening 16. As noted in FIG. 1, there are instruments situated along the entire width of the instrument panel; each of these instruments must be viewable from either the pilot's or the copilot's position.

As mentioned above, light reflected from the instruments 13 causes difficulty in readability at the various viewing angles which might be expected knowing the locations of the pilot's and copilot's heads. In an effort to set criteria to judge the suitability of various designs for instrument panels, aircraft companies have developed readability standards within certain angle limitations for the instruments. For example, FIG. 2 illustrates the angle at which a copilot (depicted by an eye 17) would view one of the instruments 13. In one particular aircraft, using an experimental instrument panel, the copilot's head is positioned approximately 19 inches from the instrument panel and approximately 32 inches away from the furthest column of instruments of the panel. Thus, angle $\alpha$, the angle between a normal (designated 19) to the instrument 13 and an imaginary line of sight (designated 18) is equal to about 60°. Thus, there should not be any extraneous reflected light from the instrument or the instrument-lighting system within a $2\alpha$ or 120° elliptical cone generated about the normal to the instrument.

In order to overcome the disadvantages of the lighting art, the lighting system as illustrated in FIG. 4 was developed. As shown, the instrument panel comprises a support plate 20 and a cover plate 22; the plates may be closely spaced. An experimental system had a ¼-inch spacing. A lighting unit 24 is positioned adjacent the support plate 20 and connected to a printed circuit 23 which is attached to a surface 25 of the cover plate 22.

An alternative embodiment (not shown) may have the lighting unit connected through an opening in the support plate 20 to an electrical power source. A removable cover plug (not shown) may be provided to act in conjunction with the cover plate 22 to allow access for replacement of the lighting unit. The support plate 20 and the cover plate 22 have openings 26 and 28, respectively, for the viewing of an instrument; the instrument is located away from the cover plate 22; that is, it is behind the cover and support plates when viewing the instrument panel from the position of the pilot or copilot.

As contemplated in a preferred embodiment, the support plate 20 may be an existing instrument panel with the cover plate and the lighting unit being mounted over or in front of the instrument panel. The diameter of the openings will depend upon the instrument face diameter and will probably be 1, 2 or 3 inches, with 3 inches being the most common.

The instrument 13 comprises a housing 30 which is supported by the support plate 20 by any suitable means, usually be being bolted together, an instrument lens 32 and an instrument pointer 34 which is pivotally mounted on a shaft 36 which is connected to an element or elements (not shown) responsive to physical changes occurring within or about the aircraft. The instrument pointer 34 will act in conjunction with a dial 40. It is to be noted that the description of the above mentioned instrument is not to limit the invention as other types and forms of instruments may be substituted.

A refractor 42 is positioned between the cover plate 22 and the support plate 20 and forms a substantially flush vertical surface with the openings 26 and 28 as depicted in FIG. 4. As can be readily seen, light from the lighting unit 24 is directed between the cover plate and the support plate to the refractor 42 where the light is refracted toward the instrument lens 32 which also refracts the light so as to have it impinge upon the instrument pointer 34 and the dial 40.

Referring now to FIG. 3, the lighting unit 24 is shown in greater detail and comprises a small light bulb 44 such as those currently being used in aircraft instrument panels, two reflector sleeves 46 and 48, polarizing elements such as Polaroid sheets 50 and 52 and focusing lenses 54 and 56. It is well known to those skilled in the optical arts that if light is incident at a specific angle upon a surface of a transparent body, light which is reflected may be substantially polarized, though very weak in intensity, while the light which is transmitted is slightly polarized but relatively strong in intensity. Applying this knowledge to the instrument lens 32, it becomes apparent that any light which is reflected from the lens 32, and thus a potential nuisance to a viewer, is of a substantially polarized nature. If nonpolarized light is thought of pictorially as a series of vectors pointing in a 360° arc, then polarized light is just a single vector pointing in only one direction and is commonly referred to as being linearly polarized.

It has been found that if the Polaroid sheets 50 and 52 are positioned to linearly polarize that portion of the light which would normally be reflected from the instrument lens, that is, situated so the direction of the transmittable polarized light is perpendicular to the polarization of the light which would normally be reflected from the lens, then there should be very little light actually reflected from the lens 32.

A common form of Polaroid consists of a thin layer of material of tiny, needlelike dichroic crystals of herapathite (iodoquinine sulfate) in parallel orientation, imbedded in a plastic matrix enclosed for protection between two transparent plates. The reflector sleeves 46 and 48 are positioned to surround the light bulb so that only a relatively small portion of the bulb is visible through openings or slits 60 and 62. The reflector sleeves 46 and 48 are constructed of highly reflective material such as polished aluminum foil or nickel. Light which does not exit through the slits is reflected internally until a reflected ray does exit through a slit. This greatly intensifies the light coming through the slit while at the same time directing the light in a desired manner and preventing light from needlessly being absorbed by or reflected from the interior surfaces of the support plate 20 and the cover plate 22.

The focusing lenses 54 and 56 are provided to further focus the light emanating from the slits 60 and 62 respectively, to provide a relatively highly collimated beam of light to be incident upon the refractor 42. The combination of the lenses, Polaroid sheets, reflectors and bulb provides a high intensity, highly directed beam of light which is polarized in a particular fashion. The elimination of unpolarized light and of light which may be reflected within the passageway created by the closely positioned cover plate and support plate prevents light from passing through the refractor 42 at such an angle as would cause it to be directed into the eyes of a viewer. Yet, the lighting system described may be manufactured at an economical cost.

Referring now to FIG. 5, there is illustrated in more detail a cross-sectional view of a refractor 42'. The refractor may be of any suitable material, such as glass or acrylic resin wherein the resin has an index of refraction between approximately 1.45 and 1.50. A dye may be introduced into the material, or one or more of the material's surfaces may be coated to impart a desired color to the transmitted light. As in the FIG. 4 embodiment, the refractor 42' is situated between a support plate 20' and a cover plate 22'. The refractor 42' is of an annular geometry having a cross section with four surfaces. The geometry and the cross section may be changed without changing the scope of the present invention. A first surface or inner surface 70 forms a flush boundary with an opening 26' of the support plate 20' and an opening 28' of the cover plate 22'. The inner surface 70 is substantially perpendicular to an instrument lens 32' so that a substantially perpendicular wall surrounds the instrument lens to prevent light emanating from one portion of the inner surface 70, from striking and reflecting off another portion of the inner surface 70 into the eyes of a viewer. Thus, it is noted that the essentially perpendicular disposition of the inner surface 70 is superior to a slanted surface from which light could be reflected into the eyes of a viewer or (if slanted in a reverse fashion) create a halo on the instrument dial. It should also be noted that light transmitted through the refractor 42' which is incident upon the inner surface 70 at an angle above the horizontal (as viewed in FIG. 5 where a horizontal line would be the equivalent of a normal to the surface 70) is reflected at a larger angle below the horizontal or normal so as to be incident upon the instrument lens 32'. The preceding description may best be illustrated by line 72 which is used to symbolize the path light would take from a source to the instrument. The normal to surface 70 is depicted by a line designated 74. As is well known to those skilled in the optical field, light entering air after traveling through a medium having an index of refraction greater than 1.00 will be deflected at the surface away from the normal. Thus, angle $\beta_2$ is greater than angle $\beta_1$.

Opposite the inner surface 70 of refractor 42' is a second surface or outer surface 76 which is oblique to the surface 70 such that if the surfaces 70 and 76 were imagined to be extended beyond the cover plate 22' as shown by the phantom lines an acute angle would be formed. The precise angle formed would depend upon a number of parameters. The three following parameters are recited for example and are not to be taken as the only parameters of concern; the distance between the cover plate 22' and the support plate 20', the distance between the inner surface 70 and the outer surface 76 and the distance of the light source from the outer surface 76.

A similar analysis to that disclosed above may be performed on the light ray 72 as it passes through surface 76. However, since the ray of light is passing from an environment having a relatively low index of refraction (air) into an environment having a relatively high index of refraction the angles relative to a normal 78 to the surface 76 would be the reverse of that disclosed for surface 70; that is, the angle between the ray of light 72 and the normal 78 in the air environment, designated $\beta_3$ is greater than the angle between the ray of light and the normal in the refractor environment, designated $\beta_4$. Thus the path of ray 72 which is initiated as instrument horizontal ray when illustrated in FIG. 5 is incident upon the instrument lens 32'. It should be noted that surfaces 70 and 76 need not be planar. If a particular illumination intensity pattern on the instrument dial is desired, e.g., concentration of the light at the dial center, either or both surfaces may be curved to produce the desired effect (thus a lens effect may be achieved in addition to the prismatic refraction effect described above). In some applications, a slight angle to the surface 70 would be desirable so that the surface 70 tilts slightly towards the instrument lens, that is, the line in FIG. 5 representing the surface 70 would be rotated slightly in a clockwise direction. In this case, light striking surface 70 from the diagonally opposite side of the instrument, will tend to be reflected down into the instrument face rather than towards the viewer. Of course, the slant of surface 76 would have to be changed to provide the desired lighting refraction.

The two remaining surfaces of the refractor 42' are a third surface or top surface 79 and a fourth surface or bottom surface 80. Surface 79 could be eliminated altogether, thus forming a three-surfaced refractor, without compromising the light directing purposes of this invention. However, it is found that adding surface 79 reduces the space required between the plates 20 and 22' and allows easier mounting of the plate 22'. Top surface 79 forms an obtuse angle with the inner surface 70 while the bottom surface 80 forms an acute angle with the inner surface 70. Once again, the precise angle is dependent upon the dimensional parameters already discussed. However, top surface 79 is made sufficiently oblique so that light reflecting off plate 20, which strikes the outer surface 76 at too great an angle to be refracted directly to the inner surface 70, will be reflected off the surface 79 to the surface 70. If the surface 79, FIG. 5 were horizontal the possibility would exist that light would be refracted toward the viewer rather than toward the instrument lens 32'. The angle of surface 79 will generally be determined by the angle of the ray of light coming directly from the light source 24 and striking the corner between surfaces 76 and 79, and the degree of refraction by surface 76. Likewise, the obliqueness of the bottom surface 80 is determined by the angle of light incident upon surface 76. If the light impinges upon surface 76 above a normal, the light will be refracted to surface 80 and then reflected at a sharp angle in a direction away from the instrument panel out toward the viewer. Thus surface 80 is sufficiently oblique to prevent light from striking surface 76 above a normal to the surface. As an added precaution, an annular wedge 82 of nonlight reflecting material such as black flocking on a resilient base may be provided to further block any light which may be incident upon it and act to position and retain the refractor while preventing the transmission of vibration to the refractor.

As illustrated in FIG. 4, an annular wedge 84 similar to the annular wedge 82 in FIG. 5 may be positioned against the third or top surface of the refractor 42. Alternatively, light blocks (not shown) may be positioned to provide the functions of the indicator angles of surfaces 79 and 80. The light blocks may be shields painted directly on the refractor surfaces or may be separate structures placed adjacent to or spaced away from the refractor. The criteria to use is a functional one. As long as the light is directed in the above-mentioned fashion, the exact cross section or shape of the refractor is relatively unimportant. Better overall instrument visibility can be obtained by providing a slanted lip 86, FIG. 5, to the cover plate 22' immediately about the opening 28'. A slight additional reduction in stray light that might reach the eye can be achieved by extending (not shown) the lip 86 slightly past the surface 70.

By way of example, it has been found that with a refractor having the following angles between surfaces: 90° between the inner surface 70 and the top surface 79, 65° between the inner surface 70 and the bottom surface 80, 100° between the bottom surface 80 and the outer surface 76 and 105° between the outer surface 76 and the top surface 79, a horizontal light ray entering the refractor will be refracted so that the following angles are made with the normals 78 and 72: $\beta_3=15°$, $\beta_4=10°$, $\beta_1=5°$ and $\beta_2=7°$.

It is to be understood that, although a preferred embodiment of the invention has been disclosed herein for purposes of illustration, various changes could be made in the form, detail and proportion of various parts of the embodiment without departing from the scope of the invention; for example, the refractor 42, FIG. 4 and 42', FIG. 5 may have more than four lateral surfaces, depending upon ease of manufacture and the dimensional parameters of the system into which the refractor is placed; FIG. 3 may be altered so that the lenses 54 and 56 are not in contact with the Polaroid sheets 50 and 52 respectively nor encapsulated in a single unit with the light bulb 44 and the reflector 46 and 48.

What is claimed is:

1. A lighting system including a light source mounted adjacent a support plate having an opening for the viewing of an instrument mounted therein, comprising:
   a. a cover plate having an opening therein aligned with said first mentioned opening mounted parallel to said support plate and enclosing said light source therebetween;
   b. refractor means mounted between said support and cover plates and about said openings therein for refracting light from said light source toward said instrument;
   c. polarizing means mounted between said light source and said refractor means for substantially polarizing light from said light source; and
   d. collimator means mounted between said polarizing means and said refractor means for collimating said polarized light from said polarizing means into parallel paths between said support and cover plates and for directing said collimated, polarized light toward said refractor means.

2. An apparatus as described in claim 1, additionally comprising:
   reflector means positioned to substantially surround said light source;
   said reflector having a slit therein surrounding said light source and located in a plane parallel to the plane of said support and cover plates.

3. An apparatus as claimed in claim 2, wherein:
   said collimator means includes a lens positioned between said polarizing means and said refractor means for collimating said polarized light passing through said slit from said light source.

4. A lighting system including a light source mounted adjacent a support plate having an opening for the viewing of an instrument mounted therein, comprising:
   a. a light transmitting refractor mounted about and conforming to said opening for refracting light from said light source;
   b. said refractor having a first surface adjacent said opening and essentially perpendicular thereto;
   c. a second surface opposite said first surface and oblique to said first surface wherein said first and second surfaces form an acute angle at the extended intersection thereof;
   d. a third surface forming an obtuse angle with said first surface;
   e. a fourth surface forming an acute angle with said first surface;
   f. a reflector positioned to surround a substantial portion of the light source and to form a slit opening thereabout;
   g. a polarizer positioned between said light source and said opening for intercepting substantially all of the light emanating from said slit opening and for polarizing said light therefrom;
   h. a lens positioned between said light source and said refractor to focus substantially all of the light which passes through said polarizer to provide a relatively collimated beam incident upon said second surface of said refractor; and
   i. said refractor positioned to refract substantially all the light which passes through said lens to provide light incident upon said instrument.

5. A lighting system as claimed in claim 4, additionally comprising:
   a cover plate parallel to said support plate and enclosing said light source and said refractor therebetween;
   said cover plate mounting said light source and including printed circuit means attached thereto for providing electrical connections to said light source.

* * * * *